Jan. 16, 1962 R. M. DOWNING ETAL 3,016,576
PROCESS FOR PREPARING EXPANDED CELLULAR MATERIALS
Filed Dec. 31, 1957 2 Sheets-Sheet 2

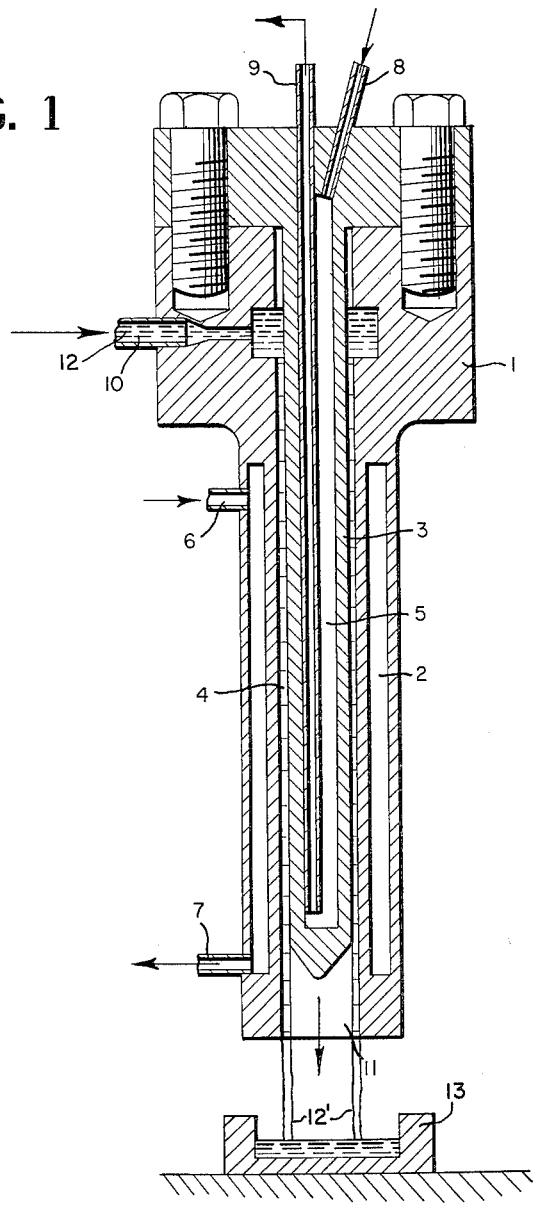

FIG. 2

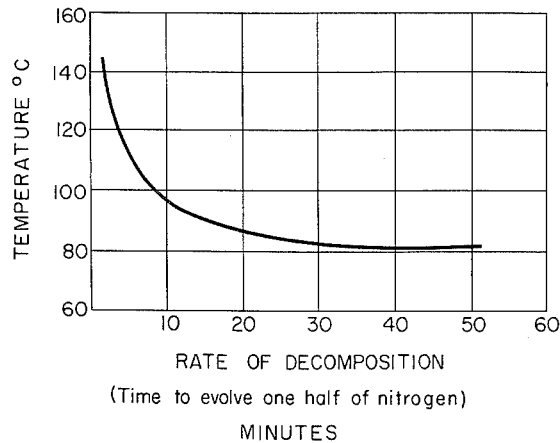

Variation of half-life of N,N'-dinitroso-N,N'-dimethylterephthalamide in a dioctylphthalate medium with varying temperature at atmospheric pressure (0.35 grams of the amide in 10 grams of dioctylphthalate.)

INVENTORS
RICHARD M. DOWNING
RICHARD E. MORTBERG
WILLIAM J. SMITH

BY Jules H. Steinberg
ATTORNEY 3,016,576
PROCESS FOR PREPARING EXPANDED
CELLULAR MATERIALS
Richard M. Downing, Woodstown, N.J., and Richard E. Mortberg, Wilmington, and William J. Smith, Delaware City, Del., assignors to E. I. du Pont de Nemours and Company, Wilmington, Del., a corporation of Delaware
Filed Dec. 31, 1957, Ser. No. 706,336
6 Claims. (Cl. 18—48)

The present invention relates to a novel process for the preparation of expanded cellular plastic materials. More particularly, the present invention relates to such a process involving the use of a chemical blowing agent which will undergo thermal decomposition at appropriate temperatures to release a gas and foam the plastic.

For discussion purposes, the invention will be described largely in terms of preparing cellular polyvinyl chloride materials though it is to be expressly understood that the invention is operable in connection with the preparation of other cellular plastics. It is anticipated, however, that the invention will find its greatest utility with the vinyls and these represent the preferred embodiment of the invention.

In the art of preparing cellular polyvinyl chloride materials with a chemical blowing agent, a liquid plastisol is first formed with the resin, a suitable plasticizer, and the blowing agent. The plastisol may also contain any of a variety of additives such as lubricants, fillers, pigments, stabilizers and the like. The plastisol is then poured into a suitable mold, which may be left open to the atmosphere if open-cell sponge is sought, or it may be sealed if closed-cell or unicellular material is desired. The mold is then heated to decompose the blowing agent and release a gas which will foam the plastisol. Further heating will gel the foamed plastisol and flux the resin with the plasticizer. The cellular material is then cooled and removed from the mold.

The principal disadvantage of the conventional blowing process for the preparation of open-cell sponge is that it is time-consuming and not readily adaptable to high speed, mass production techniques. For example, to prepare an 8" x 8" x 2" sponge in an aluminum mold normally requires about 30 minutes of heating in a conventional hot air oven (starting at room temperature) to foam the plastisol and 30 to 35 additional minutes of heating to gel the plastisol and fuse the resin and plasticizer. The overall cycle time for the preparation of a sponge from a fully compounded plastisol is thus in the neighborhood of one full hour or more.

It is an object of the present invention to provide a process for the preparation of open-cell, expanded cellular plastic materials which is materially faster than prior art techniques. It is a further object of the present invention to provide such a process which does not sacrifice quality of the cellular end-product in any way for the sake of speed of preparation. Other and additional objects will become apparent from a consideration of the ensuing specification and claims.

Prior attempts to shorten the cycle time of the conventional manufacturing techniques described above have not met with much success. Polyvinyl chloride plastisols are not good conductors of heat. If the temperature of the environment is raised too high in order to speed up the foaming and fusing of the plastisol, decomposition of the blowing agent on the surface of the plastisol will commence quite quickly, before the central portion of the layer of plastisol has even approached the temperature of decomposition of the blowing agent. This leads to an uneven and poorly expanded product which is not acceptable for most commercial end-uses.

According to the present invention these difficulties are circumvented by "preheating" the plastisol in a thin film prior to its admission to the mold in which foaming and fusion are to take place. By preheating the plastisol, in the form of a continuously flowing thin film, the temperature of the plastisol may be quickly and evenly raised to the threshold temperature range of substantial decomposition of the blowing agent. If the plastisol is preheated in this way to a temperature in the latter range, it may be collected immediately in a mold or on a moving belt where foaming and fusion of the plastisol can proceed forthwith. This method of preheating a thin fluid film of the plastisol vastly reduces the amount of time required to bring it up to the desired temperature, but in no way detracts from the quality of the cellular material which is produced. It is thus possible to obtain the highest quality sponge achievable by prior art techniques in much shorter periods of time than has heretofore been possible.

In the accompanying drawings which illustrate several aspects of the invention:

FIGURE 1 is a cross-sectional view of one form of apparatus which is suitable for carrying out the process of the present invention; and FIGURE 2 is a graph which depicts the effect of temperature on the rate of thermal decomposition of the chemical blowing agent N,N'-dinitroso-N,N'-dimethylterephthalamide.

Referring now more particularly to FIGURE 1 in the drawings, 1 designates an outer cylindrical jacket containing an internal annular steam chamber 2 along most of its length. The jacket 1 has a hollow central core in which rests an inner heating member 3 also having a central steam chamber 5. Steam is admitted to the chamber 2 at inlet 6 and steam and condensed water is removed via outlet 7. The steam for the chamber 5 is admitted at inlet 8 and exhausted at outlet 9. The inner diameter of the hollow central core of outer jacket 1 and the outer diameter of heating element 3 are such that in the assembled relation shown they define a very narrow annular space 4 therebetween. This space is in direct communication with a plastisol intake 10 by which the fully compounded plastisol 12 is pumped into the device to flow down in the form of a thin film 12' via the narrow annular space 4 and out of the device at outlet 11.

By means of high pressure steam, or other suitable heating media, the continuously flowing thin film of plastisol is heated as it passes through the apparatus. The amount and rate of heating may be very carefully controlled so that the temperature of the plastisol upon discharge from the apparatus is in the precise temperature range desired. The plastisol 12 is discharged from outlet 11 directly into a suitable mold 13 where foaming of the plastisol occurs promptly followed by subsequent gelation and fusion.

It will be readily apparent from the foregoing that the process of the present invention represents a unique and convenient technique for quickly and simply raising the temperaure of a plastisol to the desired level. Since the plastisol is being heated in the form of a thin film its temperature is raised quite quickly compared to what is possible with prior art techniques, and it is also raised very evenly and uniformly throughout. The thickness of the film is not generally critical to the invention, but in most cases represents a compromise between the thinness desired for quick and even heating of the plastisol composition and the thickness desired for higher rates of flow. With the apparatus depicted in the attached drawing film thicknesses of from $\frac{1}{64}$ to $\frac{1}{32}$ inch have proven very satisfactory. The space 4 may be equal to or slightly larger than the film thickness employed.

The actual temperatures employed will vary widely with the plastisol composition in each instance. One of the biggest factors will be the rate of thermal decomposition of the blowing agent employed and, more particularly, the effect of temperature on that rate. With a chemical blowing agent, it is not generally possible to talk about a precise thermal decomposition point. A chemical blowing agent may undergo some thermal decomposition even at room temperature. As the temperature is raised, the rate of decomposition increases. Eventually a temperature level is reached at which thermal decomposition proceeds fast enough to furnish sufficient gaseous decomposition products to foam the plastisol. At this point, the blowing agent may be said to be undergoing substantial thermal decomposition, and the temperature range of about 10–20° C. in which this commences to occur may be called the threshold temperature range of substantial thermal decomposition.

It will be readily apparent that the rates of thermal decomposition and the effect of temperature thereon of which we have been speaking will vary substantially from one blowing agent to another. It is only possible to become specfiic when referring to a specific blowing agent. One of the more effective chemical blowing agents for the preparation of expanded cellular materials is N,N'-dinitroso - N,N' - dimethylterephthalamide, otherwise known as "NTA". The use of NTA for preparing expanded cellular polyvinyl chloride is described in detail in U.S. Patent 2,776,265 issued January 1, 1957, in the name of M. F. Fuller.

In the case of NTA, the gaseous decomposition product which evolves as a result of thermal decomposition is nitrogen. The graph depicted in FIGURE 2 shows the effect of temperature on the rate of thermal decomposition of NTA, the latter expressed as the time required to evolve half of the nitrogen which is releasable. As can be seen from the graph, substantial thermal decomposition does not commence to occur in the system there involved until the temperature reaches about 95°–105° C. At temperatures below about 95° C., the half-life, so to speak, of the NTA is upwards of 12 minutes which means it would take twice that time for all of the nitrogen to be evolved. In the range of 95°–105° C., on the other hand, the half-life is only about 6 to 11 minutes, and in the system indicated, this range corresponds to the threshold temperature range of substantial thermal decomposition.

It must be borne in mind that there are other factors affecting the rate of decomposition of the blowing agent. Since the decomposition is an exothermic reaction, a good deal of heat is given off at higher blowing agent concentrations. The addition of this heat to the system tends to accelerate the rate of decomposition. At the higher blowing agent concentrations, such as 10 parts of NTA per 100 parts of resin, or higher, the initial foaming temperature must be held down somewhat to about 80° C. in order to compensate for the heat given off when substantial thermal decomposition takes place. The lower initial foaming temperature does tend to lengthen the foaming time to some extent, but not too greatly since the rate of decomposition is increased sharply once substantial decomposition has begun. Then, too, the nature of the system in which the blowing agent is dispersed will also affect the rate of decomposition. In a fully compounded polyvinyl chloride plastisol, for example, as contrasted with the dioctyl phthalate medium of FIGURE 2, the left-hand portion of the curve shown in the Figure would have a somewhat steeper slope to reflect a greater rate of decomposition at temperatures in the 80°–95° C. temperature range. For any given system with any particular blowing agent at a specific blowing agent concentration, however, the threshold temperature range of substantial thermal decomposition is easily determined visually by simply observing the extent to which foaming occurs at various temperatures.

The critical feature of the present invention is that the temperature of the plastisol is brought quickly and evenly to the threshold temperature range of substantial thermal decomposition of the blowing agent, but the plastisol is not allowed to remain within the confines of the apparatus long enough for substantial decomposition of the blowing agent to take place therein. If substantial decomposition of the blowing agent occurs within the apparatus, the gaseous decomposition products will tend to dissipate, at least in part, before the plastisol reaches the mold. The degree of expansion of the final product will thus be materially reduced. The gaseous decomposition products within the apparatus will also seriously interfere with the flow of the plastisol. Furthermore, undesirably high temperatures are likely to result in the gelation of the plastisol which will not only form a barrier to further heat flow but will also plug the annulus of flow thus clogging the equipment. Unnecessarily low temperatures on the other hand, while not interfering with the operability of the process, do not achieve the maximum advantages that can otherwise be obtained. If the plastisol is only partially preheated such that its temperature does not begin to approach the threshold temperature range of substantial thermal decomposition of the blowing agent in the apparatus, then the plastisol will have to be subjected to considerable additional heating in the mold with all the attendant disadvantages that this involves, as described above. It is true, however, that preheating the plastisol to any extent in accordance with the invention will have some advantages over the ordinary practice of heating the plastisol entirely in the mold. The higher the temperature of the plastisol (up to the threshold temperature range of substantial thermal decomposition of the chemical blowing agent) at the time the plastisol is loaded into the mold, the less time will be required for producing the cellular product. In this sense, preheating the plastisol in accordance with the process described to any extent is intended to be within the scope of the invention though the much preferred embodiment involves preheating the plastisol, as described, up to the threshold temperature range of substantial thermal decomposition of the blowing agent.

The time and temperature required to fuse open-cell vinyl foam by fluxing the resin with the plasticizer likewise varies from one instance to another, depending upon the composition of the plastisol, the thickness of the foam, the method of adding heat, etc. In the case of cellular polyvinyl chloride homopolymers, fusion takes place with most of the well-known plasticizers in the temperature range of about 150° to 170° C. for foams 1½"–3" in thickness. The preferred fusion temperature will vary somewhat from case to case depending upon the nature of the resin, the plasticizer used, the thickness of the foam, etc. However, here too, the appropriate temperatures are easily determined visually in any instance by simply heating several sections of the foam to different temperature levels and observing the effect of the temperature on the foam in each case. The critical feature here is not the specific temperature employed, but rather that fusion of the foam take place, at whatever temperature this may occur in any specific instance.

The invention is further illustrated by the following examples.

*Example I*

A plastisol is prepared of the following components:

| | Parts by weight |
|---|---|
| "Geon" 121 dispersion-grade polyvinyl chloride resin [1] | 100 |
| "Paraplex" G–62 (plasticizer)[2] | 60 |
| "Flexol" CC–55 (plasticizer)[3] | 40 |
| "Cabflex" DIOA (plasticizer)[4] | 8 |
| "Flexricin" 66 (plasticizer)[5] | 8 |
| "Chlorowax" 40 (plasticizer)[6] | 8 |
| Calcium oxide | 1 |
| "Ti Pure" (R–610) (additive)[7] | 2 |
| "Stayrite" 90 (stabilizer)[8] | 2 |
| Neutral Calcium Petronate (plasticizer)[9] | 3.6 |
| N,N'-dinitroso-N,N'-dimethylterephthalamide (blowing agent) | 7 |

(Footnotes on following page)

¹ Vinyl chloride polymer manufactured by B. F. Goodrich Chemical Company, a division of B. F. Goodrich Co.
² Epoxy polyester manufactured by Rohm & Haas Co.
³ Di(2-ethylhexyl) hexahydrophthalate manufactured by Carbide and Carbon Chemical Division of Union Carbide Corp.
⁴ Diisooctyl adipate manufactured by Godfrey L. Cabot Co.
⁵ Isobutyl acetyl ricinoleate manufactured by Baker Castor Oil Co.
⁶ Chlorinated paraffin manufactured by Diamond Alkali Co.
⁷ Titanium dioxide manufactured by E. I. du Pont de Nemours and Company
⁸ Mixture of fatty acid soaps manufactured by Witco Chemical Co.
⁹ Calcium sulfonate complex of an oil-soluble, alkyl aryl petroleum sulfonate; base number of zero; 41% active ingredient in mineral oil manufactured by L. Sonneborn Sons, Inc.

The plastisol was pumped through apparatus of the type illustrated in FIG. 1 of the attached drawing. The annulus of plastisol flow was 1/16 inch thick and the rate of plastisol flow was 30 pounds per hour. Steam at 100° C. was used as the heating medium. The plastisol flowed from the apparatus at a temperature of 100° C. into an aluminum mold directly beneath outlet 11. The heated plastisol was very fluid in nature and substantial decomposition of the blowing agent had not yet commenced. The plastisol leveled itself readily in the mold. Substantial decomposition of the blowing agent commenced soon after the plastisol was loaded into the mold and foaming of the plastisol was complete in about 6 minutes. As soon as the mold was filled it was placed in an oven at 100° C. to prevent loss of heat. Once foamed, the plastisol was transferred to a hot air oven for fusion at about 163° C. and was heated for a period of about 35 minutes at this temperature to flux the polyvinyl chloride with the plasticizer. The sponge product thus obtained was a white cellular material having a fine, uniform cell structure and a smooth top surface. The dimensions of the cellular product were 8" x 8" x 2", and the density was approximately 8.0 lbs./cu. ft. This sponge was comparable in all respects to the product obtainable by conventional techniques, i.e., loading a mold at room temperature, foaming the plastisol in a hot air oven at 100° C. for about 30 minutes and thereafter fusing the foam at a higher temperature.

*Example 2*

A plastisol was prepared from the following components:

| | Parts by weight |
|---|---|
| "Geon" 121 dispersion-grade polyvinyl chloride resin¹ | 100 |
| "Cabflex" DDP (plasticizer)² | 40 |
| "Santicizer" 603 (plasticizer)³ | 30 |
| RC-016 (plasticizer)⁴ | 12 |
| RC-TG-9 (plasticizer)⁵ | 12 |
| Calcium oxide | 1 |
| "Duponol" ME (additive)⁶ | 1.6 |
| "Stabelan" HR paste (stabilizer)⁷ | 3 |
| Neutral Calcium petronate (plasticizer)⁸ | 3.6 |
| N,N'-dinitroso-N,N'-dimethylterephthalamide (blowing agent) | 10.5 |

¹ Vinyl chloride polymer manufactured by B. F. Goodrich Chemical Company, a division of B. F. Goodrich Co.
² Didecyl phthalate manufactured by Godfrey L. Cabot Co.
³ Butyl decyl phthalate manufactured by Monsanto Chemical Co.
⁴ Isooctyl palmitate manufactured by Rubber Corp. of America.
⁵ Triethylene glycol diperlargonate manufactured by Rubber Corp. of America.
⁶ Dry fatty alcohol sodium sulfate manufactured by E. I. du Pont de Nemours and Company.
⁷ Ba-Cd chelating epoxy system manufactured by Harwick Standard Chemical Co.
⁸ Calcium sulfonate complex of an oil-soluble, alkyl aryl petroleum sulfonate; base number of zero; 41% active ingredient in mineral oil manufactured by L. Sonneborn Sons, Inc.

The plastisol was pumped through the apparatus illustrated in FIG. 1 of the attached drawing in the manner described in Example 1. The heating medium was steam at about 160° C., and the rate of plastisol flow was 120 pounds per hour. The plastisol at a temperature of 90° C. was collected in a Masonite mold with an aluminum bottom placed under the outlet 11. Decomposition of the blowing agent commenced immediately upon loading of the mold, and foaming of the plastisol was complete within about 10 minutes. The cellular product was used by heating in a dielectric oven for approximately 70 seconds. The sponge thus obtained was a white cellular material 7½" x 7½" x 2" and had a fine, uniform cell structure and a smooth top surface. The density was about 6.0 lbs./cu. ft. This sponge was comparable in all respects to the product obtainable by conventional techniques, i.e., loading a mold at room temperature, foaming the plastisol for about 50 minutes at 80° C. in a hot air oven and thereafter fusing the foam at a higher temperature.

*Example 3*

A plastisol was prepared from the following components:

| | Parts by weight |
|---|---|
| "Geon" 121 dispersion-grade polyvinyl chloride resin manufactured by B. F. Goodrich Chemical Company | 100 |
| Dioctyl phthalate (plasticizer) | 150 |
| Basic lead carbonate (stabilizer) | 10 |
| N,N' - dinitroso - N,N' - dimethylterephthalamide (blowing agent) | 7 |

The plastisol was pumped through the apparatus illustrated in FIGURE 1 of the attached drawing in the manner described in Example 1. The heating medium was steam at about 115° C. and the plastisol flowed from the apparatus at about 80° C. Rate of plastisol flow was 60 pounds per hour. The plastisol was collected in a Masonite mold with an aluminum bottom placed under outlet 11. Decomposition of the blowing agent commenced immediately upon loading of the mold and foaming of the plastisol was complete within 10 minutes. The cellular product was fused in the same manner as the product in Example 2. The sponge thus obtained was a white cellular material 7½" x 7½" x 2" with smooth surfaces and a fairly uniform cell structure. The density was about 15 lbs./cu. ft.

*Example 4*

A plastisol was prepared from the following components:

| | Parts by weight |
|---|---|
| "Geon" 121 dispersion-grade polyvinyl chloride resin manufactured by B. F. Goodrich Chemical Company | 100 |
| Didecyl phthalate (plasticizer) | 100 |
| Dibasic lead phosphite (stabilizer) | 10 |
| N,N' - dinitroso - N,N' - dimethylterephthalamide (blowing agent) | 7 |

The plastisol was pumped through the apparatus illustrated in FIGURE 1 of the attached drawing in the manner described in Example 1. The heating medium was steam at about 115° C. and the rate of plastisol flow was 60 pounds per hour. The temperature of the plastisol leaving the apparatus was about 90° C. The plastisol was collected in a Masonite mold having an aluminum bottom placed under outlet 11. Decomposition of the blowing agent commenced immediately upon loading of the mold and foaming of the plastisol was complete within 9½ minutes. The cellular product was fused in the same manner as the product in Example 2. The sponge thus obtained was a white cellular material 7½" x 7½" x 2⅛". It had smooth surfaces and a uniform cell structure. Its density was 10 pounds per cubic foot.

Example 5

A plastisol was prepared from the following components:

| | Parts by weight |
|---|---|
| "Geon" 121 dispersion-grade polyvinyl chloride resin manufactured by B. F. Goodrich Chemical Company | 100 |
| Flexol CC-55 (plasticizer)[1] | 50 |
| Monoplex DOS (plasticizer)[2] | 50 |
| Calcium oxide | 1 |
| "Duponol" ME[3] | 1.6 |
| Stabelan HR paste (stabilizer)[4] | 3 |
| Neutral Calcium Petronate | 3.6 |
| N,N' - dinitroso - N,N' - dimethylterephthalamide (blowing agent) | 7 |

[1] Di(2-ethylhexyl) hexahydrophthalate manufactured by the Carbide and Carbon Chemical Division of Union Carbide Corporation.
[2] Dioctyl sebacate manufactured by Rohm & Haas, Inc.
[3] Dry fatty alcohol sodium sulfate manufactured by E. I. du Pont de Nemours and Company.
[4] Ba-Cd chelating epoxy system manufactured by Harwick Standard Chemical Company.

The plastisol was pumped through the apparatus illustrated in FIGURE 1 of the attached drawing in the manner described in Example 1. The heating medium was steam at about 115° C. and the rate of plastisol flow was 120 pounds per hour. The temperature of the plastisol at the exit of the apparatus was 105° C. The plastisol was collected in a Masonite mold having an aluminum bottom placed under outlet 11. Decomposition of the blowing agent commenced immediately upon loading of the mold and foaming of the plastisol was complete within 8 minutes. The cellular product was fused in the same manner as the product in Example 2. The sponge thus obtained was a white cellular material 7½" x 7½" x 2". It had fine, uniform cell structure, smooth surfaces, and a density of 7.4 pounds per cubic foot.

Example 6

A plastisol was prepared from the following components:

| | Parts by weight |
|---|---|
| "Geon" 121[1] | 100 |
| Cabflex DDP (plasticizer)[2] | 100 |
| Calcium oxide | 1 |
| "Duponol" ME[3] | 1.6 |
| Advastab BC-105 (stabilizer)[4] | 3 |
| Advastab E-49 (stabilizer)[5] | 2 |
| Neutral Calcium Petronate | 3.6 |
| N,N' - dinitroso - N,N' - dimethylterephthalamide (blowing agent) | 7 |

[1] Dispersion-grade polyvinyl chloride resin manufactured by B. F. Goodrich Chemical Company.
[2] Didecyl phthalate manufactured by Godfrey L. Cabot Co.
[3] Dry fatty alcohol sodium sulfate manufactured by E. I. du Pont de Nemours and Company.
[4] Liquid barium-cadmium type stabilizer manufactured by Advance Solvents & Chemical Corporation.
[5] Non-metallic complex organic stabilizer manufactured by Advance Solvents & Chemical Corporation.

The plastisol was pumped through the apparatus illustrated in FIGURE 1 of the attached drawing in the manner described in Example 1. The heating medium was steam at about 140° C. and the rate of plastisol flow was 60 pounds per hour. The temperature of the plastisol at the exit of the apparatus was 80° C. The plastisol was collected in a Masonite mold having an aluminum bottom placed under outlet 11. Decomposition of the blowing agent commenced immediately upon loading of the mold and foaming of the plastisol was complete within 10 minutes. The cellular product was fused in the same manner as the product in Example 2. The sponge thus obtained was a white cellular product 7½" x 7½" x 2". It had a fine, uniform cell structure, smooth surfaces, and a density of 7.5 pounds per cubic foot.

Example 7

A plastisol was prepared from the following components.

| | Parts by weight |
|---|---|
| "Geon" 121 dispersion-grade polyvinyl chloride resin manufactured by B. F. Goodrich Company | 100 |
| Dioctylphthalate (plasticizer) | 37.5 |
| Di(2-ethylhexyl) azelate (plasticizer) | 37.5 |
| "Chlorowax" 40 (plasticizer)[1] | 37.5 |
| "Santicizer 141" (plasticizer)[2] | 37.5 |
| "Dyphos" (stabilizer)[3] | 5 |
| Boric acid (activator) | 6 |
| BIK urea (activator)[4] | 7.5 |
| Dinitrosopentamethylenetetramine (blowing agent) | 4 |

[1] Chlorinated paraffin manufactured by Diamond Alkali Company.
[2] Octyl diphenyl phosphate manufactured by Monsanto Chemical Company.
[3] Dibasic lead phosphite manufactured by National Lead Company.
[4] A finely divided urea manufactured by Naugatuck Chemical, division of U.S. Rubber Company.

The plastisol was pumped through the apparatus illustrated in FIGURE 1 of the attached drawing in the manner described in Example 1. The heating medium was steam at about 140° C., and the rate of plastisol flow was 60 pounds per hour. The temperature of the plastisol at the exit of the apparatus was 80° C. The plastisol was collected in a mold having Masonite sides and an aluminum bottom placed under outlet 11. Decomposition of the blowing agent commenced immediately upon loading of the mold and foaming of the plastisol was complete within 10 minutes at 150° C. in a hot air oven. The cellular product was fused in the same manner as the product in Example 2. The sponge thus obtained was a white cellular material 7½" x 7½" x 2". It had a fine, uniform cell structure, smooth surfaces, and a density of about 16.6 pounds per cubic foot.

The invention is operable with a very wide variety of resins, plasticizers, and chemical blowing agents. The process is particularly advantageous in connection with the preparation of cellular polyvinyl chloride homopolymers and copolymers, and it is anticipated that the invention will find its greatest use with such resins. Any of the conventional and well-known plasticizers for the polyvinyl chloride may be used as may any chemical blowing agent having a conveniently obtainable decomposition temperature range including, for example, the N,N'-dinitroso-N,N'-dimethyl amides of terephthalic, adipic, succinic, sebacic, and 4,4'-bibenzoic acids, ethylene bis (N-nitrosobenzamide), p-(t-butyl)benzazide, p-carbomethoxybenzazide, 2,2' - azo-bis-(isobutyronitrile), acid-activated dinitrosopentamethylenetetramine, etc. Among the many well-known plasticizers for polyvinyl chloride which may be used in the present process are didecyl phthalate, dioctyl sebacate, di-2-ethylhexyl, phthalate, dioctyl adipate, butyl decyl phthalate, isooctyl palmitate, triethylene glycol diperlargonate, etc. The plastisol may also contain any of a wide variety of optional additives such as stabilizers, pigments, dyes, lubricants and the like. The presence or absence of these additives in no way affects the process.

The heated plastisol is generally fluid enough to flow quickly and easily into the mold and to level itself off within the mold. Since decomposition of most chemical blowing agents is exothermic, the reaction is, for the most part, self-sustaining until completion. However, some heat is usually lost from the surface of the plastisol in the mold so the plastisol during foaming is exposed to additional heat, such as a heat lamp or an oven to insure uniform foaming. However, the exposure to such additional heating is only for a period of from 5 to 10 minutes, as illustrated in the examples, compared to the normal heating time of about 30 minutes with conventional techniques. The fusing of the foam to flux the resin and the plasticizer is generally performed in a hot air oven for a period of about 30 minutes. This time can be shortened considerably by use of a dielectric oven.

The rate of flow of the plastisol through the apparatus is dependent upon a variety of factors including the viscosity of the plastisol, the capacity of the delivery pumps, the temperature of the heating medium, the thickness of the plastisol film, etc., and is not generally critical to the invention, provided the plastisol does not remain in the apparatus long enough for substantial decomposition of the blowing agent to occur.

The apparatus depicted in the attached drawing is in no sense critical to the present process. The process can be carried out with many other and different forms of equipment, and with other heating means such as electric coils and electric band heaters. Similarly, heating media other than steam may be used in the apparatus shown.

The essential feature of the invention is raising the temperature of a thin film of the plastisol quickly and uniformly to a point at or near the threshold temperature range of substantial thermal decomposition of the blowing agent. Though the process may be conveniently performed with the apparatus illustrated, it is in no sense dependent on or limited to this particular apparatus.

The invention has been described in the foregoing specification. It will be readily apparent to those skilled in the art that many variations in the equipment, compositions, and techniques described may be made without departing from the spirit of the invention. We therefore, intend to be limited only by the following claims.

We claim:

1. A process for preparing expanded cellular resinous materials which comprises forming a fluid plastisol with a resin, a suitable plasticizer, and a chemical blowing agent, heating a continuously flowing thin film of said fluid plastisol to a temperature in the threshold temperature range of substantial thermal decomposition of the blowing agent, immediately discharging said heated plastisol into a mold wherein decomposition of the chemical blowing agent occurs to release a gas and foam the plastisol, and thereafter heating the foamed plastisol further to flux the resin with the plasticizer.

2. A process for preparing expanded cellular polyvinyl chloride which comprises forming a fluid plastisol with a polyvinyl chloride resin, a suitable plasticizer, and a chemical blowing agent, heating a continuously flowing thin film of said fluid plastisol to a temperature in the threshold temperature range of substantial thermal decomposition of the blowing agent, immediately discharging said heated plastisol into a mold wherein decomposition of the blowing agent occurs to foam the plastisol, and thereafter heating the foamed plastisol further to flux the resin with the plasticizer.

3. A process for preparing expanded cellular polyvinyl chloride materials which comprises forming a fluid plastisol with a polyvinyl chloride resin, a suitable plasticizer, and N,N'-dinitroso-N,N'-dimethylterephthalamide, heating a continuously flowing thin film of said plastisol to a temperature in the neighborhood of about 80°–105° C., immediately discharging said plastisol into a mold where decomposition of the N,N'-dinitroso-N,N'-dimethylterephthalamide occurs to release a gas and foam the plastisol, and thereafter heating the foamed plastisol further to a temperature in the range of about 150° C. to 170° C. to flux the polyvinyl chloride resin with the plasticizer.

4. In the process for preparing expanded cellular polyvinyl chloride materials wherein a fluid plastisol formed from a polyvinyl chloride resin, a suitable plasticizer therefore, and a chemical blowing agent is heated to decompose the blowing agent, the essential steps of heating said plastisol in the form of a continuously flowing thin film to a temperature in the threshold temperature range of substantial thermal decomposition of the blowing agent and immediately discharging said heated plastisol into a mold wherein the decomposition of the blowing agent occurs to foam the plastisol.

5. In the process for preparing expanded cellular polyvinyl chloride materials wherein a fluid plastisol formed from a polyvinyl chloride resin, a suitable plasticizer therefore, and N,N'-dinitroso-N,N'-dimethylterephthalamide is heated to decompose the N,N'-dinitroso-N,N'-dimethylterephthalamide, the essential steps of heating the plastisol in the form of a continuously flowing thin film to a temperature in the neighborhood of about 80° to 105° C., and immediately discharging said heated plastisol into a mold where decompostion of the N,N'-dinitroso-N,N'-dimethylterephthalamide occurs to release a gas and foam the plastisol.

6. A process for preparing expanded cellular polyvinyl chloride materials which comprises forming a fluid plastisol with a polyvinyl chloride resin, a suitable plasticizer, and dinitrosopentamethylenetetramine, heating a continuously flowing thin film of said fluid plastisol to a temperature in the threshold temperature range of substantial thermal decomposition of the dinitrosopentamethylenetetramine, immediately discharging said heated plastisol into a mold wherein decomposition of the dinitrosopentamethylenetetramine occurs to release a gas and foam the plastisol, and thereafter heating the foamed plastisol further to flux the resin with plasticizer.

References Cited in the file of this patent

UNITED STATES PATENTS

| 2,353,362 | Rudd | July 11, 1944 |
| 2,528,506 | Foye | Nov. 7, 1950 |
| 2,663,908 | Maier et al. | Dec. 29, 1953 |
| 2,717,418 | Piperoux et al. | Sept. 13, 1955 |
| 2,829,117 | Lindemann | Apr. 1, 1958 |
| 2,889,291 | Moore | June 2, 1959 |

FOREIGN PATENTS

| 500,298 | Great Britain | Feb. 7, 1939 |

OTHER REFERENCES

"British Plastics," P.V.C. Paste—Its Properties and Uses, April 1948, pp. 168, last 8 lines column 2.